(12) United States Patent
Crookham et al.

(10) Patent No.: US 7,209,958 B2
(45) Date of Patent: Apr. 24, 2007

(54) APPARATUS, SYSTEM AND METHOD FOR WIDE AREA NETWORKING TO CONTROL SPORTS LIGHTING

(75) Inventors: Joe P. Crookham, Oskaloosa, IA (US); Antonio Rivera, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 693 days.

(21) Appl. No.: 09/951,988

(22) Filed: Sep. 13, 2001

(65) Prior Publication Data
US 2002/0044045 A1 Apr. 18, 2002

Related U.S. Application Data

(60) Provisional application No. 60/232,338, filed on Sep. 14, 2000.

(51) Int. Cl.
*G06F 15/16* (2006.01)
(52) U.S. Cl. ...................................................... 709/217
(58) Field of Classification Search ................ 709/217, 709/223, 224
See application file for complete search history.

(56) References Cited

U.S. PATENT DOCUMENTS

| | | | |
|---|---|---|---|
| 3,594,762 A | 7/1971 | Gardberg et al. | |
| 4,541,013 A | 9/1985 | Alpert | |
| 5,341,121 A | 8/1994 | Rada | |
| 5,383,187 A * | 1/1995 | Vardakas et al. | 370/312 |
| 5,483,535 A | 1/1996 | McMillen | |
| 5,594,740 A | 1/1997 | LaDue | |
| 5,729,471 A | 3/1998 | Jain et al. | |
| 5,745,126 A | 4/1998 | Jain et al. | |
| 5,769,527 A | 6/1998 | Taylor et al. | |
| 5,846,132 A | 12/1998 | Junkin | |
| 5,860,733 A | 1/1999 | Stone et al. | |
| 5,882,263 A | 3/1999 | Chung | |
| 5,898,587 A | 4/1999 | Bell et al. | |
| 5,929,849 A | 7/1999 | Kikinis | |
| 6,002,394 A | 12/1999 | Schein | |
| 6,028,522 A | 2/2000 | Petite | |
| 6,030,109 A | 2/2000 | Lobsenz | |
| 6,035,304 A | 3/2000 | Machida et al. | |
| 6,044,405 A | 3/2000 | Driscoll, III et al. | |
| 6,052,054 A * | 4/2000 | Hampson et al. | 340/568.6 |
| 6,415,245 B2 | 7/2002 | Williams et al. | |
| 6,532,217 B1 * | 3/2003 | Alkhatib et al. | 370/252 |
| 6,546,419 B1 * | 4/2003 | Humpleman et al. | 709/223 |
| 6,681,110 B1 * | 1/2004 | Crookham et al. | 455/420 |
| 6,694,356 B1 * | 2/2004 | Philyaw | 709/217 |
| 6,732,158 B1 * | 5/2004 | Hesselink et al. | 709/208 |
| 6,990,531 B2 * | 1/2006 | Vange | 709/240 |

FOREIGN PATENT DOCUMENTS

EP 0 573 323 A 12/1993

(Continued)

OTHER PUBLICATIONS

Miller, S; "Smartpoles" Offered to Sub for Cell Towers NEWS-POST; Online Aug. 4, 2000, XP002205444; Internet URL:http://www.smartpole.com/ms_news.html, Prtd. Jul. 9, 2002; 1 pg.

Tomseth, A.; "Smartpoles Preposed for School": The Connection; Online Aug. 4, 2000; Internet URL:http://www.smartpole.com/ms_news.html; Prtd. Jul. 9, 2002; 1 pg.

(Continued)

*Primary Examiner*—David Y. Eng
(74) *Attorney, Agent, or Firm*—McKee, Voorhees & Sease, P.L.C.

(57) ABSTRACT

A system for using a wide-area communication network, e.g. the Internet, as a conduit to communicate to and from the location of sports filed lighting, to control operation of the lighting, or monitor the lighting or other events at the location.

13 Claims, 12 Drawing Sheets

FOREIGN PATENT DOCUMENTS

| | | |
|---|---|---|
| WO | WO 9847120 | 10/1998 |
| WO | WO 99 47216 A | 9/1999 |
| WO | WO 00 07341 A | 2/2000 |
| WO | WO 01 03414 A | 1/2001 |

OTHER PUBLICATIONS

"Smartpoles peep into the future"; Stirling Times Community; URL:http://www.flexiposter.com/details.asp?CATID-5&ID-74; Prtd. Jul. 9, 2002; 1 pg.

"Fixed It! Baseball ScoreBook" 1999 Super Shareware.

* cited by examiner (V)_____ vs(H)_____
Scoresheet is for (VorH)____Date_____Game#____League, Tourney, Other(L/T/O)____
A=how to 3rd, B=how to 2nd, C=balls, D=strikes, E=out or how to home; F=LU# RBI; G=How to 1st or the hit

| # | Player Name  RBIs | PI | 1 | 2 | 3 | 4 | 5 | 6 | 7 |
|---|---|---|---|---|---|---|---|---|---|
| 9 | 1 Player 1 | 4 | 11 ◆ 1 LL | . . | . . | 2 III ◆ 1 | ·③· | . . | DP 2〉1 |
|   |   | 1 |   |   |   |   |   |   |   |
|   |   | 1 | 42B |   | 1B | 4BB | F7 |   | F5 |
| 8 | 2 Player 2 | 5 | 1·① · | . . | ·① · | SB ◆ 3 | . . | ·① · | ③·1 |
|   |   | 1 |   |   |   |   |   |   |   |
|   |   | 1 | K |   | b3 | 4 1B |   | F3 | DPY |
| 23 | 3 Player 3 | 9 | 1·②·1 | . . | ·②· | 5〈4 〉1 | . . | . . | PB 4 ◆ |
|   |   | 1 |   |   |   |   |   |   |   |
|   |   | 1 | F4 |   | 14 | E5 |   |   | 5BB |
| 7 | 4 Player 4 | 2 | 5B 〉5 M 1B | . . | ·③· | ·③· 5 | . . | . . | ②·1 |
|   |   | 1 |   |   |   |   |   |   |   |
|   |   | 1 |   |   | F9 | 6U 1B | F7 |   | F8 |
| 14 | 5 Player 5 | 3 | 11 ·③·1 LL | . . | ◆ | /1 | . . | . . | 6 BC 〉1 |
|   |   | 1 |   |   |   |   |   |   |   |
|   |   | 1 | Kc |   | 7 1B | BB |   |   | 2B |
|   | Runs: Total |   | 1:1 | 0:1 | 0:1 | 5:6 | -:- | 0:6 | 1:7 |
|   | Hits: Total |   | 2:2 | 0:2 | 1:3 | 5:8 | -:- | 0:8 | 2:10 |
|   | Errors: Total |   | 0:0 | 0:0 | 0:0 | 1:1 | -:- | 0:1 | 0:1 |
|   | Left on Base: Total |   | 1:1 | 1:2 | 1:3 | 3:6 | -:- | 1:7 | 0:10 |
|   | Earned Runs: Total |   | 1:1 | 0:1 | 0:1 | 3:4 | -:- | 0:4 | 0:5 |
| # | Pitcher Name |   | IP-LB# | BF | H | R | ER | BB | HB |
| # | Pitcher 1 |   | 7 | 35 | 8 | 5 | 5 | 1 | 2 |
|   |   |   |   |   |   |   |   |   |   |
|   |   |   |   |   |   |   |   |   |   |
|   |   |   |   |   |   |   |   |   |   |

*Fig. 2*

LOCAL SPORTS SUMMARY

Youth league teams of interest

Score Box

Highlights
Game Summary
Replay game

High school teams of interest

Score Box

Highlights
Game Summary
Replay game

College

Score Box

Highlights
Game Summary
Replay game

Professional

Score Box

Highlights
Game Summary
Replay game

Fig. 7

APPARATUS, SYSTEM AND METHOD FOR WIDE AREA NETWORKING TO CONTROL SPORTS LIGHTING

CROSS-REFERENCE TO RELATED APPLICATIONS

This application is a continuation of now abandoned provisional application U.S. Ser. No. 60/232,338 filed Sep. 14, 2000, the disclosure of which is hereby specifically incorporated by reference in its entirety.

BACKGROUND OF THE INVENTION

This invention relates to a system and method of providing Internet connectivity to and through outdoor sports field lighting and outdoor security lighting.

One aspect of the invention relates to a system and method of controlling and monitoring sports lighting and outdoor security lighting and the capability to do so from a remote Internet location as well as using existing or newly installed elevated outdoor sports field lighting and outdoor security lighting as ready-made wireless hubs for a wide area network.

Another aspect of this invention relates to an apparatus and method for an electronic scorebook. In particular, this invention relates to the use of an electronic scorebook that stores scoring information for a sporting contest and updates a scoreboard with the information. This invention further relates to connecting the electronic scorebook or the scoreboard to a network such as the Internet and accessing the electronic scorebook and related information remotely. This invention further relates to integrating software that creates audio and/or graphic description of the recorded information in integrating that information with other related information from other sources such as historical information about participants, sports news, and promotions, public service announcements, and advertisements. It could also include video images in still or action format.

One goal of sports lighting is to provide bright and evenly illuminated playing fields. Similarly, a goal of wide area security lighting is to provide illuminated parking lots, sidewalks, streets, parks, and other areas. Providing bright and evenly illuminated lighting requires a great deal of control over many aspects of lighting. This control may involve the need to turn lighting on or off at particular times. This control may also involve the need to monitor the condition of lights. Owners of sports facilities using sports lighting may not have the expertise or qualifications to properly operate these lighting systems and may find it a drain on resources to properly monitor and maintain the lights due to high cost or other factors.

This problem may be particularly significant for government (e.g. municipality, school district, county, township, state, provincial, territorial, state, federal, city, recreation district, park and recreation district), quasi-public (e.g. privately run athletic fields, leagues, and other venues) and privately owned facilities. Sports and security lighting is found everywhere from small towns to large cities. A single government unit or sub-unit or private owner may operate multiple sports lighting and/or security lighting at multiple locations thus increasing the difficulty in operating and maintaining the lights.

Traditionally, lighting systems are purchased and installed by a group or entity which is then responsible for operation and maintenance, including turning lights on or off. Substantial administrative and labor burdens are used to keep track of schedules and to have a person physically go to the site and turn lights on or off and otherwise monitor and maintain the conditions of the lights.

Furthermore the maintenance and monitoring of lights as well as the control systems used have been limited due to these restrictions. The control of lights has generally been limited to a manual selection of "on" or "off" or a timer that turns lights on or off at a particular time. In security lighting, there has also been use of a proximity switch to turn security lights on or off based on the proximity of a moving object such as a person. More effective features are not used because that would increase the need for maintenance, control and monitoring.

There is a need in the art to address these problems, particularly as recreational activities of many types evolve and expand, and more are conducted at times that need artificial lighting.

Attempts are being made to address these issues. One attempt involves use of cellular telephone transceivers to receive wireless instructions from a remote control center. If voice channels are used then there is an associated cost of service that is recurring and substantial. If only the control channels are used there may need to be an arrangement with a specialized cellular service that can encode and decode the information from the control channels. One example of such a service is that provided by Cellemetry, LLC. Furthermore, given the nature of this type of solution there are limitations related to the available bandwidth and the latency of the communication, thereby presenting limits on flexibility and functionality.

Wide area networks such as the Internet provide wide area communications coverage. However, hard-wired connections are the normal communications link. Hard wiring to date has taken advantage of the existing land line telephone infrastructure. However, capacity and bandwidth are limitations, particularly in plain old telephone service (POTS) implementations. Fiber optics and other wire innovations have presented improvements. However, there are still limitations, such as lack of adequate infrastructure and the associated time and cost of creating and maintaining infrastructure.

Recently, another wire option is use of coaxial cable of the same type as cable television, as the communications link. Speed, throughput, and bandwidth are improved over analog telephone communications. However, the coverage of cable wiring is not as ubiquitous as telephone lines and may not be available from a telecommunications provider in all areas. The required infrastructure results in substantial cable installation and maintenance. There is therefore a need in the art for better access to wide area networks.

Other problems in the art relate to Internet connectivity for general uses and not just for use in controlling sports lighting. The relationship between sports lighting and Internet connectivity will be become clearer in context of the present invention that solves both problems.

One method of providing remote control of devices is the use of Internet based systems such as found in a multitude of Internet devices and appliances. One example of a Internet control system that permits home automation functions such as controlling lights to be controlled remotely via a web browser is the Home Seer product from Keware Technologies. One problem with extending this type of system to sports lighting is the service cost to provide an Internet connection to the light control system. Furthermore there are technical limitations to this type of system. A phone line connection to an Internet service provider is generally not dedicated. When phone lines are not dedicated at both sides of the connection (Internet provider and Internet subscriber) then there is not a continuous Internet connection. If they are dedicated, the service cost will increase, particularly if a long distance connection is used. Even if such lines are dedicated, there can be a loss of the connection due to weather conditions and outages.

Digital services can be used to provide an Internet connection that is continuous. These costs can be substantial where digital lines are used.

Conventional land line systems have been challenged in some markets through the use of wireless systems. Wireless systems have some advantages over land line systems such as fiber optic lines, cable lines, and POTS lines. The first advantage is the amount of bandwidth or speed that a fixed wireless device can provide. For example, if a standard telephone line (POTS) is used in conjunction with a modem, the connection speed is limited to 56 kilobits per second. This speed can be increased by using digital lines but there is an associated increase in cost and limited availability. Examples of digital lines include digital subscriber lines (DSL) connections as well as T1 or T3 connections. DSL connections typically provide speeds of 768 kbits/second. T1 lines can operate at speeds of 1.5 Mbits/second, while T3 lines operate at 4.5 Mbits/second.

A second advantage of wireless systems is that they do not require the same communications infrastructure as landline systems. In landline communications, lines must be run from location to location if preexisting lines are not available. If the lines are not already available, it will take time to build the required infrastructure. Furthermore, the lines will also need to be maintained. Wireless systems do not require the same infrastructure required for landline based solutions.

Wireless communication can be either mobile wireless or fixed wireless. Mobile wireless communication such as that used in cellular phone systems permits receivers or transmitters to move around. The movement of the receivers and/or transmitters introduces additional technical problems including multipath phenomenon and fading problems as is well known in the art. These problems limit the reliability and the speed or bandwidth of a mobile wireless system.

These problems can be overcome by using a fixed wireless system. Despite these advantages, fixed wireless systems have a significant limitation. Fixed wireless systems require a line of sight transmission from a subscriber to a hub. This need for line of sight requirement is related to the frequencies being used. For example, broadband wireless is typically in the bands between 2 to over 40 GHz. At these frequencies, the corresponding wavelength of the radio waves is small. Due to the small wavelengths involved, these radio waves cannot effectively be communicated through physical barriers and are more prone to the multipath phenomenon. Thus there is a need for line of sight transmission.

The Internet has developed at an amazingly fast rate. What is called the Internet backbone currently provides connectivity points, called "points of presence" of the Internet, to most parts of the United States and even the world, mainly using existing infrastructure such as telephone lines. Significantly high speed/throughput rates are achievable. However, connectivity from the points of presence to the ultimate end users is still problematic. This is called "the last mile". Currently the "last mile" must use wireline twisted pair telephone lines to reach most households. Thus, even if there is high speed/throughput to and from the points of presence, conventional copper phone lines can not handle such speed/throughput. They are therefore disappointingly unsatisfactory in performance. It is simply not cost effective to lay such things as fiber optic lines to residential homes.

Attempts are being made to overcome this problem by using cable TV lines or satellite signals. However, each has their own limitations and represent significant cost.

It is therefore an objective of the present invention to provide a method of providing remote control of sports field lighting and security lighting.

It is a further objective of the present invention to provide a method and system of monitoring the status of sports field lighting and security lighting remotely.

It is yet further objective of the present invention to provide a method and system of providing Internet connectivity to sports field lighting and security lighting.

It is yet another objective of the present invention to provide a system and method of providing wireless Internet service to subscribers.

Many locations using sports lighting regularly hold athletic events. Examples of common events are baseball, softball, football, and soccer. A record of many of these games is maintained by keeping a scorebook, such as is well known. Many such sports venues also maintain scoreboards so that players, coaches and spectators can view a summary of the game.

Problems in the art regarding scorebooks and scoreboards are discussed below. The relationship of scorebooks and scoreboards will become clear with regards to a description of the present invention.

In the field of sporting contests, scores and other contest-related information are recorded. Such information is important for many reasons. For example, this information is needed in order to determine the eventual outcome of a contest, including the eventual winner of a contest. In addition, this information is often compiled into statistics, which are used by both participants in the sporting event, as well as coaches, fans and spectators. This type of information has generally been written in a scorebook in order to keep a record of the sporting event.

Some efforts have been to create an electronic scorebook that can be used to keep score and to replace the handwritten scorebook. For example, software can be used on a computer that will permit scoring to be kept. This also facilitates record-keeping with regards to statistics. One example of a computer software product that can be used to keep score for baseball is Fixed It!'s Baseball ScoreBook, e.g. version 2.0C shareware, that operates on a Microsoft Windows platform.

One problem with these prior art types of scorebooks is that it is too easy for inaccuracies to exist in the scoring information. For example, where statistics are involved, a written scorebook provides many opportunities for error in calculations or in transposing numbers and other information. The use of an electronic scorebook can reduce or eliminate calculation errors but also introduces typographical and related errors. Furthermore, the scoring may not be done on a timely or complete basis, particularly where volunteers are utilized for the process.

Furthermore, the software is just dedicated to creating an electronic version of a conventional scorebook. It does not appear to disclose or teach anything about using the scoring for additional purposes, or enhancing the value of electronically scoring a game by integrating it with other functions or systems.

Scoreboards provide updated information concerning the status of sporting contests. For example, at baseball fields, scoreboards will typically provide the cumulative score, the score for each inning, the number of outs in the current inning, the current batters name, the current batter's count and other information, e.g. cumulative hits and errors per team. This and other scoring information must be entered into a scoreboard in order for the scoring information to be displayed on the score board. Also, to begin the scoring the score must record the participants names and other related information.

Room for improvement exists with regard to scoreboards. Many are still manually operated, which are cumbersome and labor intensive to operate. Errors can occur. Electric or electronic scoreboards also may contain errors based on misinformation to the person entering information to the scoreboard, or mistake by the operator. They also require dedicated controllers and input devices, many times have not other function and not integratable with other devices or systems.

Therefore, there is a real need in the art for improvement in how scorebooks and scoreboards are maintained for athletic events. There is also a real need in the art for improvement in the state of the art regarding communication between athletic facilities and participants, players, or other interested parties.

There is a need in the art for utilization of information about a game or event and integration of the information with other information.

It is therefore an objective, feature or advantage of one aspect of the present invention to provide an apparatus, method and system that is capable of receiving scoring information and both recording scoring information and updating a scoreboard according to the information received.

It is a further objective, feature or advantage of the invention to provide the capability of calculating statistics based on the scoring and related information and updating a scoreboard with the calculated information.

It is a still further objective, feature or advantage of the present invention to provide a means for broadcasting the scoring information over a network.

Yet another objective, feature, or advantage of the present invention is to provide a system for providing information to and from a scoreboard.

Yet another objective of the present invention is to provide a predefined size summary of the events by selecting what to report from an order of priority and to submit an article to news media for reporting the event.

SUMMARY OF THE INVENTION

The present invention relates to several aspects of remotely located elevated sports lighting last mile connectivity to the Internet for a variety of advantageous functions.

One aspect relates to apparatus and methods for at least partial wireless communications directed towards remote control of remote wide area lighting. Wireless transceivers can be placed at or near the location of a lighting system. A wireless transceiver, within operating range the transceiver on the lighting system, provides a wireless link to the lighting system. The wireless transceiver what will be called a transcriber unit can then be operatively connected to the Internet. This can be by wire or wireless. A central control includes a database of events relating to the lighting system such as a schedule for turning on and off. Additionally, remote diagnostics and remote sensing can take place providing the central control with intelligence about what is occurring on site of the lights.

Another aspect according to the invention is the utilization of lighting systems for wide areas and the means for elevating such lights to provide an elevated Internet wireless hub for line of sight wireless Internet connectivity to locations surrounding the lights. The elevated lights, generally elevated by a pole, provide cost effective structure for an Internet hub. Such Internet hubs can either be created using existing poles or with newly constructed systems. Therefore, dual functionality of the pole eliminates the need for a separate dedicated wireless hub pole.

A still further aspect of the present invention is a system and method for providing a wide area network utilizing wide area lighting system poles or other elevated structure as wireless hub locations. The proprietor of the lighting systems can cooperate with control central for the lighting systems to provide cost effective high speed Internet service to consumers.

Another aspect includes a method and apparatus for an electronic scorebook. The electronic scorebook is capable of controlling an electronic scoreboard. In one embodiment, the electronic scorebook is capable of providing scoring information across a network. In other embodiments, the electronic scorebook can play an optional part of a system of communicating information to and from sports fields, compiling information about on-going sporting events and the players of such event, and using such information to create Internet accessible simulations, summaries, or broadcasts of the events; further optionally combining advertising or third party programming. Still further, the compilation of information about sporting events from a plurality of such events, as well as information about the players or others associated with the event, all sent to a central location, can be mined for information or can create cumulative statistics or demographic information that is useful for a variety of reasons.

BRIEF DESCRIPTION OF THE DRAWINGS

FIG. 2 is a diagrammatic view of a conventional scorebook.

FIG. 7 is an example of another display at another point along the timeline of FIG. 5.

DETAILED DESCRIPTION OF EXEMPLARY EMBODIMENTS

Figure 1A:
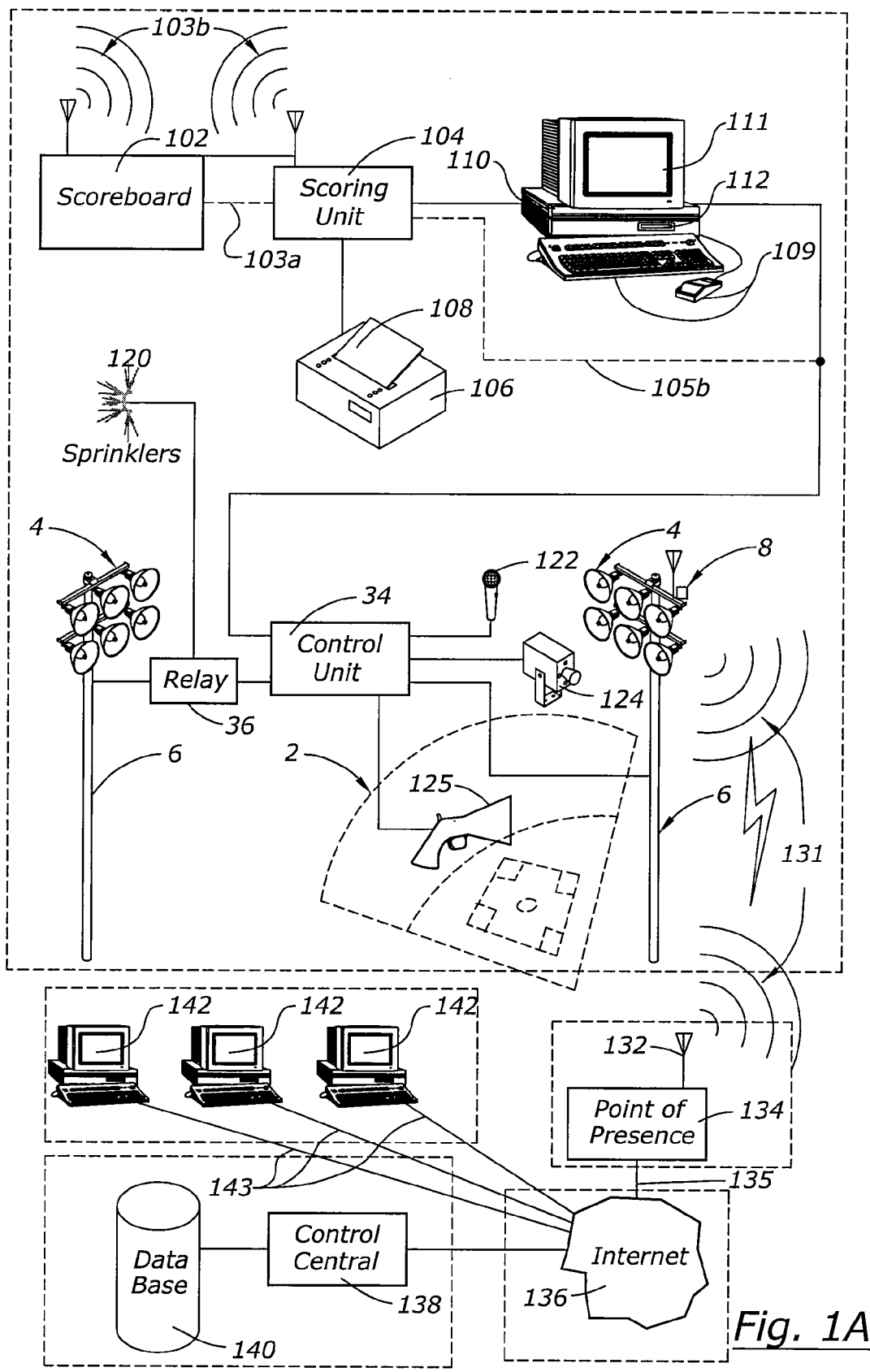
FIG. 1A is a diagrammatic view of one exemplary embodiment according the present invention, illustrating a central control and multiple devices that can access central control via the internet, as well as an electronic scorebook system and other sensors, monitors, or controllers in wireless last mile communication with a point of presence of the internet.
Figure 1B:
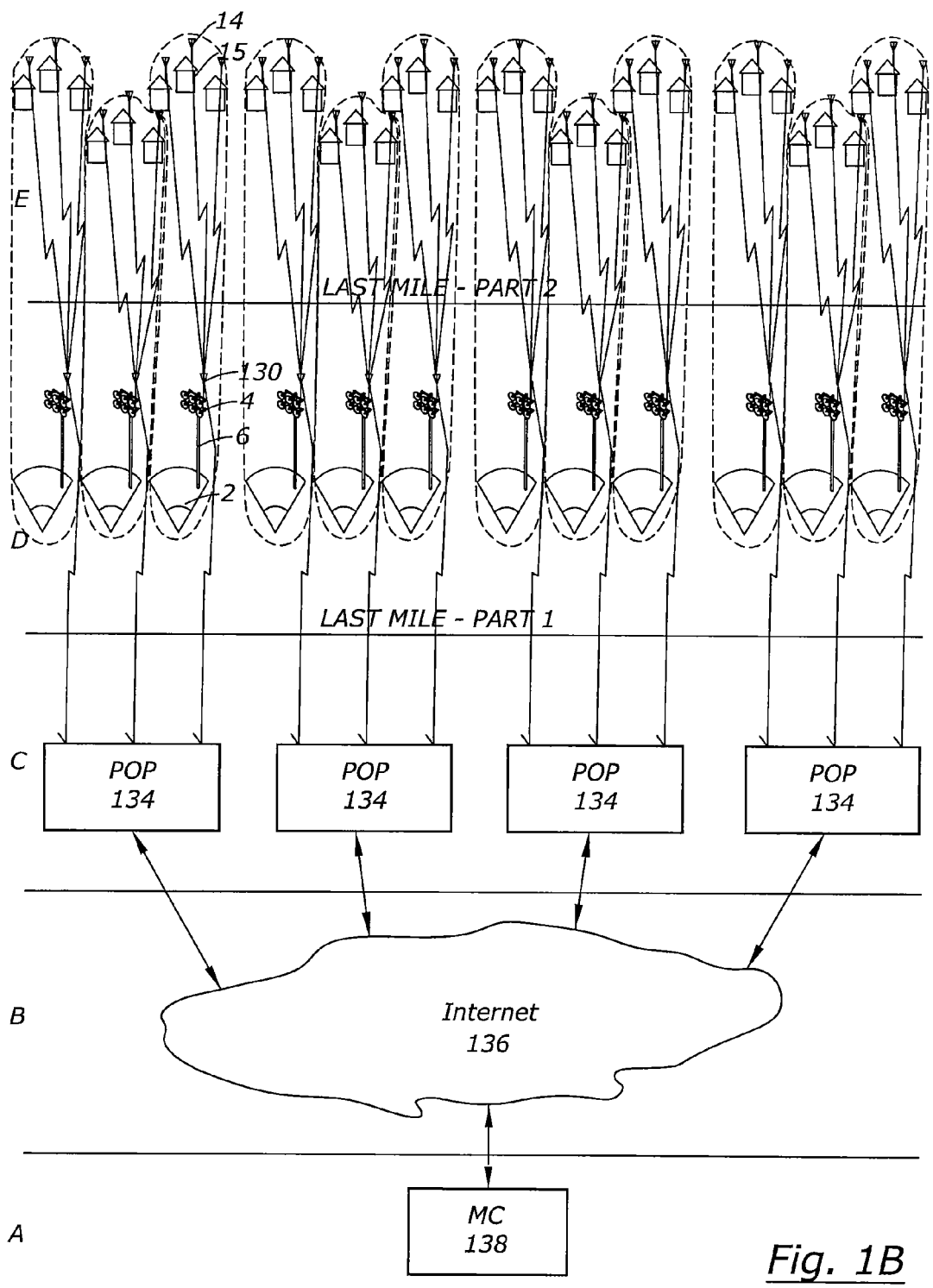
FIG. 1B is a high level diagram of the hierarchy of the embodiment of FIG. 1A diagrammatically illustrating the embodiment applied to a plurality of points of presence, each in turn in communication with a plurality of event sites, each of which in turn can optionally be in communication with a plurality of end point internet users.

For a better understanding of the invention, a first embodiment will now be described in detail. Frequent reference will be taken to the drawings. Reference numerals and letters will be used in the drawings to indicate certain parts and locations in the drawings. The same reference numerals or letters will indicate the same parts or locations throughout the drawings unless otherwise indicated.

One exemplary embodiment of the present invention contemplates using an electronic scorebook as a means of providing a record of a sporting event or contest. For purposes of this example, the sport of baseball is selected. It is to be understood that the present invention contemplates all sporting events, contests, and their equivalents and all information that is kept related to these sporting events, or analogous situations.

In the sport of baseball, scoring information includes the current inning, the number of runs in each inning, a cumulative number of runs, the number of outs in the current inning, the current count, the results of the batter's turn at bat, the status of the batter if he/she gets on base or scores a run. In traditional scoring, a diagram of the baseball diamond is used to provide information that is better represented pictorially than by words or numbers alone.

Referring to FIG. 1A, a scoreboard 102 is connected to a scoring unit 104. The connection may be a wireless connection 103b or a wired connection 103a. The scoring unit 104 may be connected to a printer 106 or other device that can provide output 108 (e.g. hardcopy printout) that includes scoring information, reports, or summaries. The scoring unit is also connected to a computer 110 with memory, e.g. nonvolatile storage 112. The computer 110 may also be an embedded control or an equivalent. Still further, it could be a portable computer or such things as a Palm Pilot or equivalent. The storage element or memory 112 may include, but is not limited to a magnetic media such as a hard drive, floppy disk, zip media; optical media such as a CD, DVD; or solid-state memory.

It is to be understood that the scoring unit 104, output device 106, and computer 110 can be connected in a number of ways. For example, scoreboard 102 can be directly connected to a computer through an interface such as, but without limitation, a serial, parallel, or bus interface. The scoring functions of the scoring unit 104 can then be implemented in software. Similarly, the present invention contemplates that the scoring unit may include a keypad, keyboard, or other input device 109, an optional display 111, a memory, and interfaces to both scoreboard 102 and a control unit 34 such that a separate computer is not necessary. The present invention also contemplates that the storage element 112 could be located at the control unit 34 which may also be a computer, an embedded control or an equivalent.

Control unit 34 can interface with scoring unit 104 through connection 105(b) as well as input devices such as a microphone 122, a video camera 124, or a radar gun 125. The present invention also contemplates other types of inputs such as temperature and environmental sensors as well as other monitoring devices.

In addition to these devices output devices such as relays 36 can be controlled. Relays 36 can be used to turn and off sports lighting 4 or sprinklers 120. It is to be understood that other types of devices can be used. The invention also contemplates that some devices in electrical connection with the control unit 34 have both input and output functions.

The control unit 34 is electrically connected to sports lights 4 on one or more light poles 6. On light pole 6 or sport lights 4 there is also a transceiver or base station 8. Transceiver 8 communicates with transceiver 132 via radio waves 131 which is at what will be called a point of presence 134. The point of presence 134 can be an Internet service provider (ISP). The term "point of presence" is commonly used in the art to indicate a point of conventional hi-speed connectivity (e.g. fibre optics or T1 telephone line) 135 to the Internet. This provides a wireless connection through the point of presence 134 to a network such as the Internet 136. This communication link can be broadband in nature and may be line of sight. The height and position of the sports lighting pole 6 permits transceiver 8 to be within line of sight of transceiver 132.

Control central 138 is also connected to network 136. Control central also optionally has a database 140. This database contains scoring and related information as will be discussed in greater detail. User devices 142 (e.g. PC's or network appliances) are also connected to the network 136. When network 136 is the Internet, then users 142 can potentially access this information from anywhere an Internet connection is available, both wire and wireless through connections 143.

The ability to begin the scoring process by downloading the roster information from a web site is helpful in simplifying the work and providing useful historical information that can be used to enhance the reporting of the event. Furthermore the access to the internet is a by-product of a wireless system that is made available for purposes related to control of the lights and other electrically controlled devices such as irrigation systems or door locks.

Interconnection and operation of these components is within the skill of those of ordinary skill in the art. The components and protocols for communication are known in the art.

FIG. 2 is a graphic illustration of one type of conventional score card 152, such as available through Fixed It brand Baseball Scorebook software. It provides an inning by inning template for recording events in the game, including events tied to each player. As is widely known in the art, certain symbols or notations indicating certain events or results are used to record the game. These symbols or notations can then be interpreted to review how the game unfolded and how the players performed.

For example, symbols such as the diamond 154 can be used to indicate that player 1 scored in the fourth inning. Other symbols indicate player 1 reached base on a walk (BB or base on balls), that the walk occurred on a three balls and one strike count. Other information is given. This type of scoring can take many different forms, many of which are well-known in the art. The method of scoring a baseball or softball score book is not a part of this invention, and therefore will not be further explained.

Figure 3:
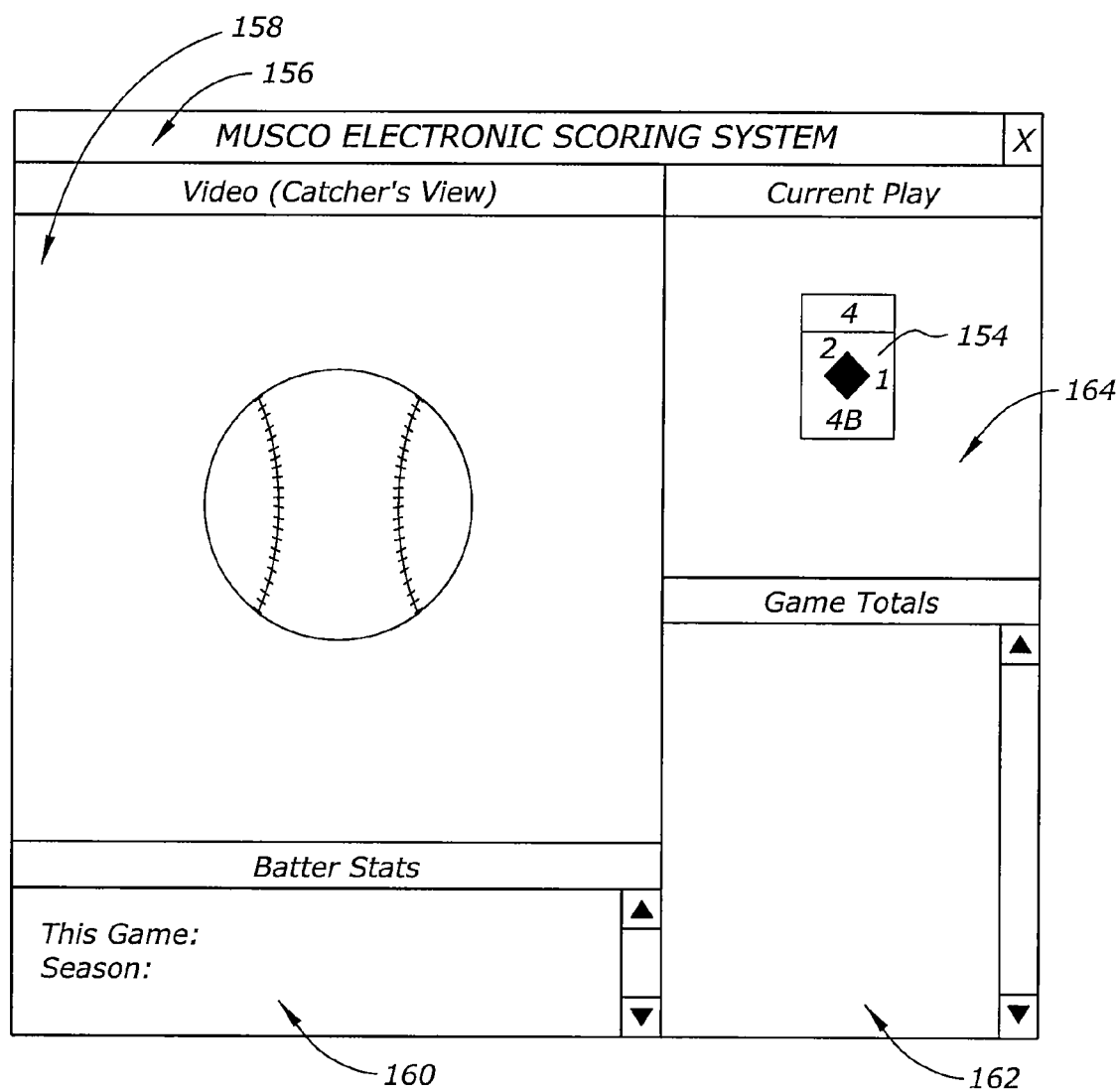
FIG. 3 is a graphical representation of a software application.

FIG. 3 shows a representation of a graphical user interface that can be used for scoring and related information to be displayed, including when this information is displayed at a remote location over the Internet. It is to be understood that many different types of information can be displayed and many forms of software can be used to develop and display this information as is well known in the art. For example, and without limitation, the present invention contemplates a Java application, a cgi program, a perl script, a JavaScript, or a Visual Basic script for Internet use. FIG. 3 is merely a representative example for baseball information. In FIG. 3 there is a title bar 156. There are four additional windows or frames. Window 158 shows video of the sporting event from a certain perspective, e.g. via a digital video camera 124. Although presently it is difficult to obtain the processing speed to send continuous video, it is contemplated that technological improvements in the field will soon allow the same. A still picture or updated still pictures and other graphical portrayals are also contemplated via a digital still camera 124. It is to be understood that more than one video or still shot perspective or view for a given sporting event may be available. One can interject prior taken or other digital pictures, video or graphics. Window 160 displays statistics for the current batter or for a particular player or team. Window 162 displays game totals. Window 164 shows scoring for a current play 154.

Figure 4:
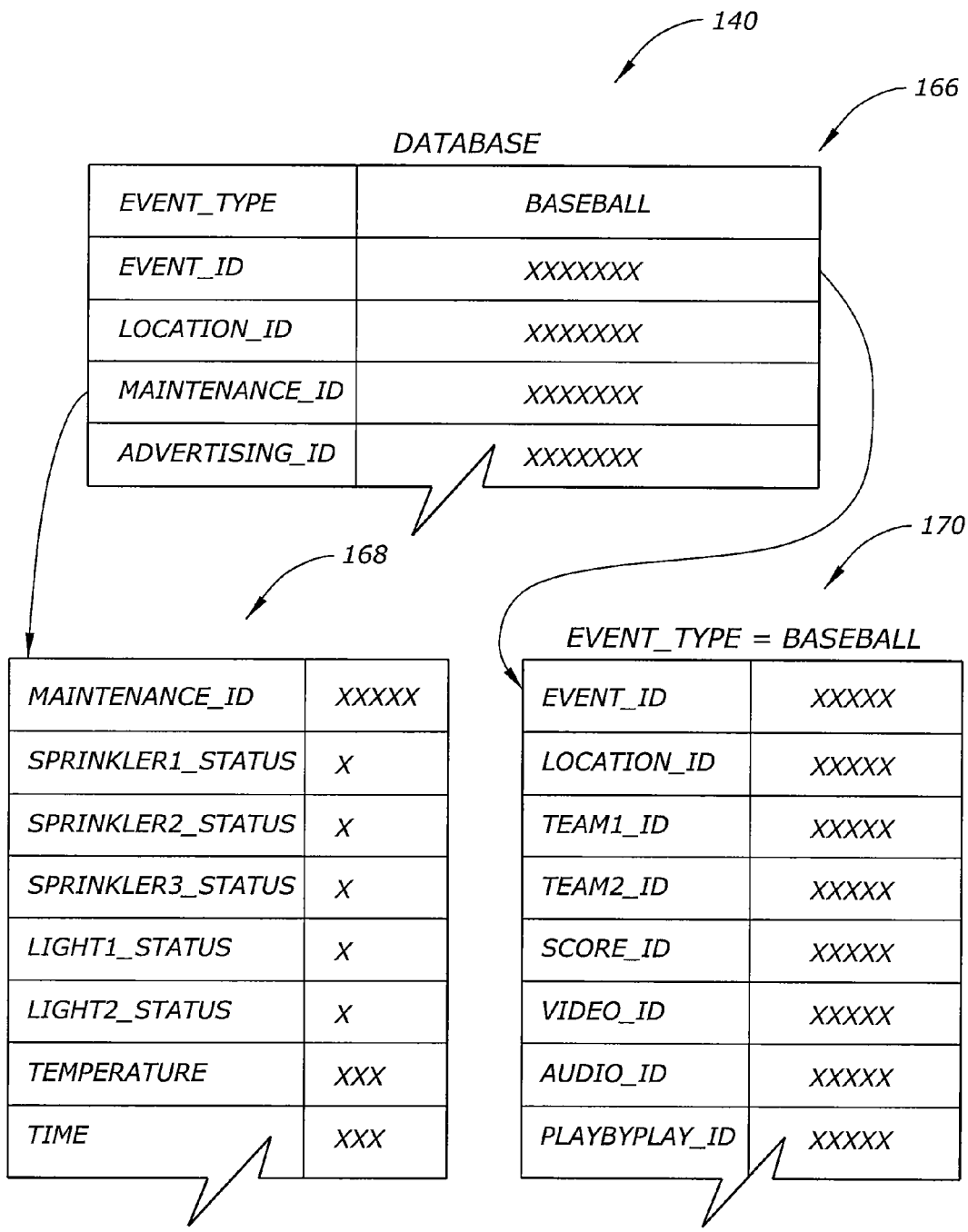
FIG. 4 is a representation of a database.
Figure 5:
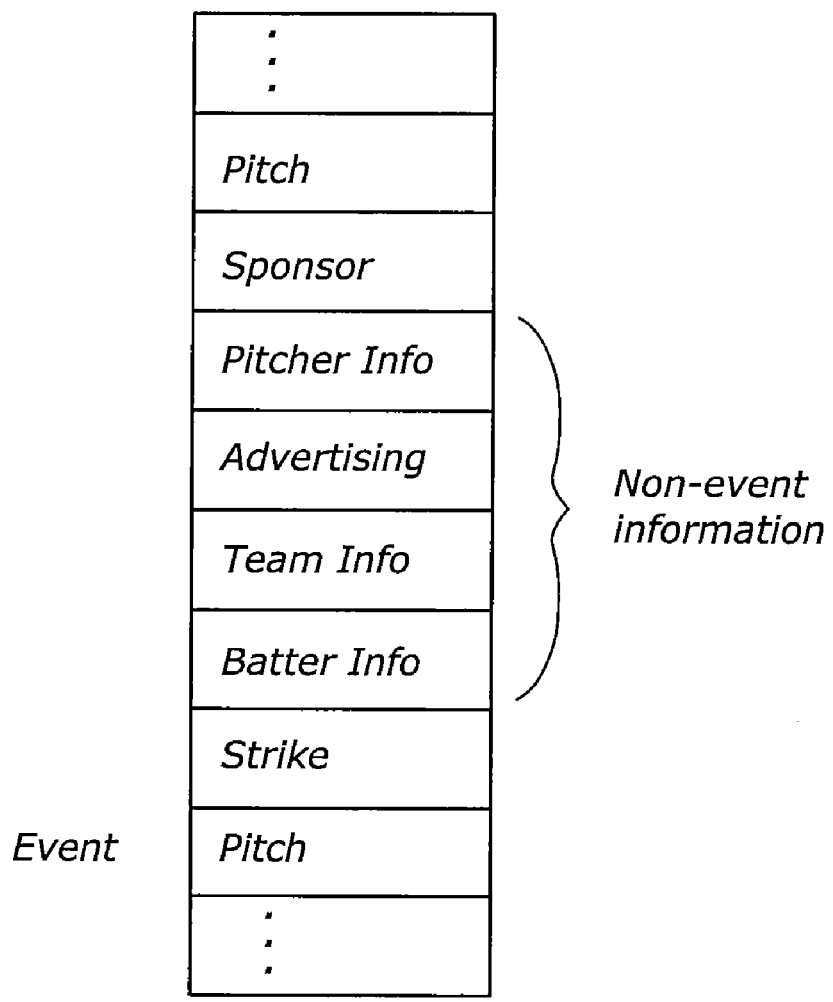
FIG. 5 is a diagrammatic representation of an exemplary timeline for display of information relating to a baseball game broadcast according to the invention.
Figure 6:
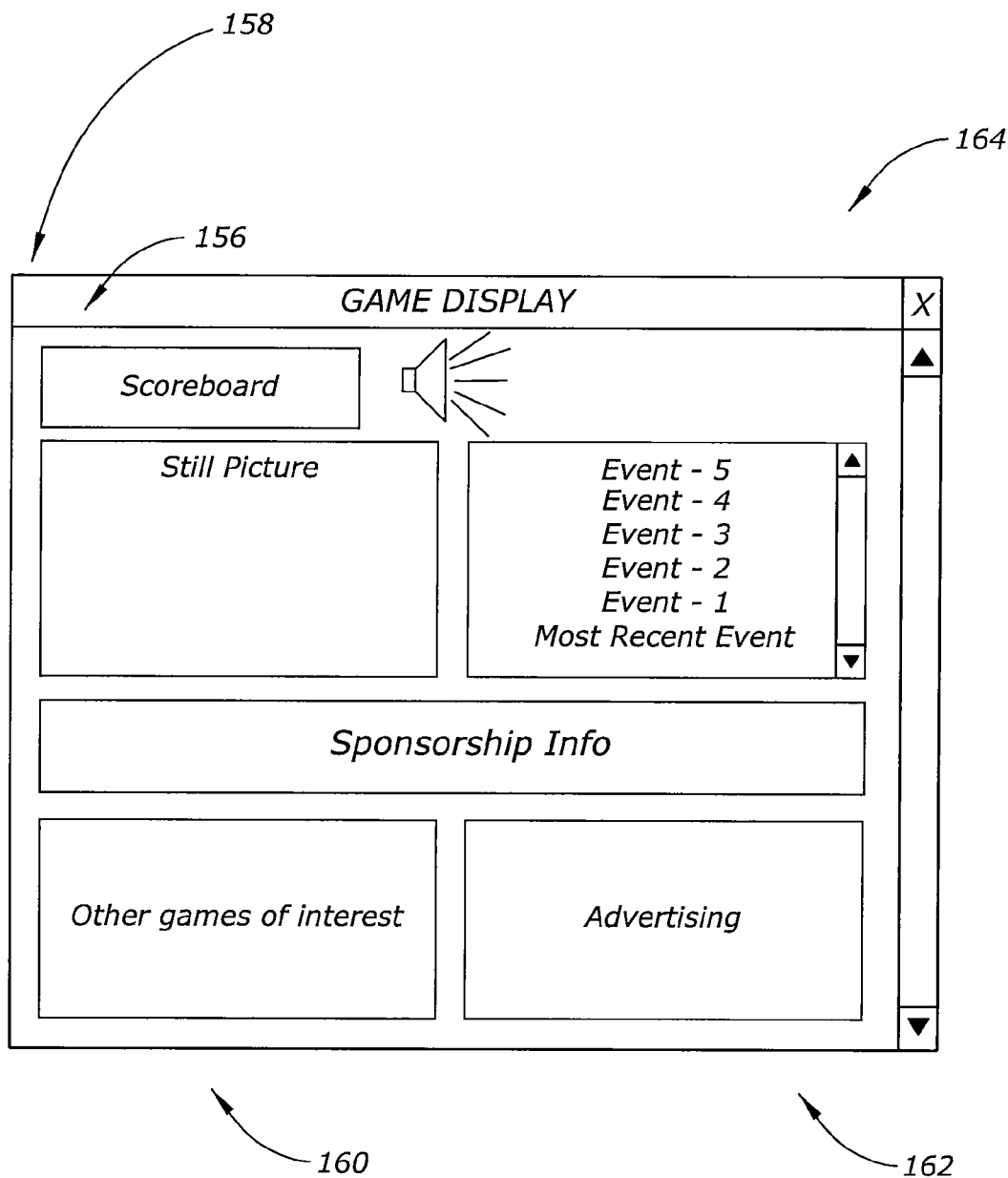
FIG. 6 is an example of a display at a point along the timeline of FIG. 5.

FIG. 4 displays a possible database 140 in greater detail. The database 140 includes one or more tables that may be relational. For example, an event table 166 contains identifying fields related to an event such as a particular baseball game. One or more of these fields may be contained in one or more additional tables. Each table is defined by a set of fields and contains records as is well known in the art.

The present invention contemplates that the database is searchable and that the searching process may be a pre-defined search based on events that are recorded such as a batter coming to bat might be preprogrammed to cause a search and reporting of the prior results in this game and for the season. Thus, for example, key words can be searched in order to find information related to a game, a player, or other information maintained in the database. Other indexing is possible. It is to be understood that database 140 also may contain scheduling and maintenance information for the sporting event venue or field or park as well as staffing and other information.

It is to be further understood that database 140 may also contain information related to spectators of sporting events, including, but not limited to, contact information, which events were viewed and when and what types of events are of interest. Based on this information, information contained in the database can be used to alert spectators of related sporting events and other information that the spectators may be interested in receiving.

The present invention contemplates numerous options and embodiments. The electronic scorebook of the present invention permits the information to be entered into an electronic system and stored. Optionally, the present invention permits statistics for the current sporting event to be updated with the scoring information. For example, each batter's batting average can be updated following each at bat. Similarly, the batter's number of runs-batted-in (RBI's) can be updated. These and other statistics are well known in the art.

In one embodiment, the electronic scorebook of the present invention is connected to an electronic scoreboard at the location of the sports field. The scoreboard displays relevant scorebook information. Thus, in this embodiment of the present invention, scoring information need only be input once to be electronically stored and to be displayed on a scoreboard. Displaying the information that is recorded provides the additional benefit of providing verification of the scoring information. The umpires (or other officials), participants and spectators who see or hear the event and also see or hear the scoring information may detect errors or omissions and can alert the scorekeeper accordingly thereby assuring that the scorebook recording is timely and accurate. The present invention also contemplates that the scoring information can be made available in the form of reports that are available at any time. Reports for the sporting event can be made available during or immediately following the event electronically or in hard copy, or can be stored such that they can be viewed at any later time.

The ability to electronically store statistics and events about the game, mined from the process of scoring the game, allows for a variety of software functions to be written. For example, multiple levels of information could be compiled on request from software. Additionally, different information could be retrieved at different times by the software. For instance, the first appearance of a batter could result in display of a certain type of information (e.g. height, weight, home town). During the second at bat different information (e.g. cumulative batting average for the season) could be displayed, and so on.

The software could also compile or display different information during a game based on a software evaluation of certain occurrences during the game, or the course of the game.

Still further, the compilation of statistics about a game can be stored, accumulated, processed and made available to others. For example, statistics could be sold to a baseball league, a sports network, or even a business such as a soft drink or athletic equipment company.

Other uses of the scoring of the game and statistics are of course possible.

In another embodiment, the scoring information or statistics can be broadcast over a network, such as the Internet. By broadcast, it is meant to display, mine or retrieve data or signals from the electronic scorebook, from camera 124, or from sources such as other media or advertising, compile it is an intelligible form, and make it accessible via the internet. For example, in almost real time, the box scoring from the electronic scorebook can be displayed along with periodic still pictures (e.g. current balls, current strikes, the current batter, the current pitcher, the spectators, the field), statistics (e.g. regarding the batter or pitcher or team(s)), audio play by play, or other information or graphics. Thus a simulation of a broadcast of the game is made via the system. One accessing the web site could "watch" the "broadcast" even if in a very remote location from the actual game. For example, a parent away on a business trip could "watch" his/her child's game. A grandparent in a far away location could "watch" his/her grandchild's game.

Optionally, additional information can be broadcast, including without limitation, sports news from another source, advertising and sponsorship information, scheduling information, information for related events, audio of the sporting event, video of the sporting event, directions to the event location, weather information for the sports field, status information about number of spectators or for lighting, equipment, sensors, and other information. Also still picture information from the event or continuous video images either segmented or continuous could be delivered. Also, the invention would permit the input of real time audio reporting such that a youth sports event could allow a youth to learn to do play by play reporting, or trained reporters could supplement the electronic reporting that is provided by the scorebook features of the invention. Software would allow the scorebook system to utilize the available unused time to provide electronic voice generated messages from the various available sources or to override the live audio when time is needed for other messages such as scores, news or advertising. Also the scorebook can simultaneously send out video images from graphics, still photos, action video, or other images for related information such as news from other events or advertising. The result of the invention would provide the potential to have a broadcast world wide available for every event that utilizes a recording system with no additional effort at the event beyond the normal recording process. The present invention contemplates this information being available in a real-time, delayed, or on-demand basis.

Thus, broadcast of the game can be simulated in a manner that any number of persons could access the Internet and follow a display of information about the game as it progresses. The forms which the display of the game can take are almost infinite. One model would be to recreate a scorecard in real time. The Internet viewer could watch as the scorecard is updated during the game. At the other extreme, live video and/or audio could report the game.

Additionally, many options exist regarding additional information that could be displayed or presented. The information could be textual, graphical, video, audio, or combinations of the same. It could relate directly to the game being played. It could relate indirectly (e.g. season batting averages, lifetime batting averages, information about the players or teams, etc.). It could also be unrelated to the game (e.g. advertisements, news, messages, pictures).

Part of simulation of the game could even include computer generated audio describing the game based on translation of the entries in the electronic scorebook. Such a simulated play-by-play audio could include information about players, teams, location; again mined from data in the system.

A related embodiment of the present invention includes a database that provides scoring as well as additional information. This database is made available on the Internet for viewing or searching. For example, a grandparent in one location can find that a grandchild has a game at a second location so that the grandparent can monitor the game. By way of another example, a professional baseball scout can search for high school left-handed pitchers with low earned run averages (ERA's) and have thrown fastballs at rates exceeding 90 miles per hour and then monitor the pitching performance of such pitchers including by way of optional video.

The present invention also permits the sports field to receive as well as send information over the network connection. For example, lighting, irrigation systems, and other facility management functions can be controlled from a remote location. The present invention also contemplates that the electronic scorebook and the electronic scoreboard can be controlled from a remote location. It is to be understood that some functions of the present invention may have restricted or otherwise limited access. For example, a password may be required to control the scoreboard from a remote location or to turn on sprinklers from a remote location. The present invention contemplates the use of passwords and other security measures as are well known in the art.

Another embodiment of the present invention includes advertising or sponsorship information. This information can be displayed on the scoreboard or may be displayed as a part of a remote access. For example, when scoring and related information is provided over the Internet, advertising information may also be displayed. The particular advertising information being used may be selected on the basis of the current scoring and related information. For example, in a baseball game, certain advertising information may be associated with a home run. Whenever a home run occurs, the associated advertising information can be simultaneously displayed. Advertising rates or sponsorship costs can be set according to the desirability of associations with different scoring information. By way of a further example, advertising or sponsorship information can also be associated with a particular player such that when that player is involved in a particular play, the associated advertising information is displayed.

Still further, by programming, advertising could be interspersed between action events of a game so that the "viewer" of the game is not interrupted during an event, but in between events. The software could even be designed to time its display at regular or irregular intervals, or such that it is visual a certain percentage of a time period. Other options are of course possible.

Thus, a system for electronic scoring and score reporting of a sporting event has been disclosed which solves problems and deficiencies in the art. It will be readily apparent to those skilled in the art that any sporting event can use the system that has been described. From the foregoing, it will be observed that numerous variations and modifications may be affected without departing from the spirit and scope of the novel concepts of the present invention. It is understood that no limitation with respect to the specific embodiment illustrated herein is intended or should be inferred. The terms and expressions which have been employed herein are used as terms of description and not of limitation. There is no intent in the use of such terms and expressions to exclude any future equivalents of features shown and described herein, but it is recognized that various modifications are possible within the scope of invention now claimed.

Another embodiment of the present invention includes a system of sports news that is providing from one source but can be input into each individual events broadcast by selecting it on a real time basis from an available data base that is continuously updated from a single source. The news data can be classified in the data base by type of event and selected by the scorebook system based on its relevancy or by a predefined arrangement that is programmed into the scorebook. For example, if a sponsor such as Major League Baseball agreed to provide the scorebook system to a baseball league then the scorebook system could be set to report MLB scores and information in conjunction with the broadcast, thereby giving MLB the opportunity to promote its sport to the listening/viewing audience, on-line over the internet or to the live audience at the game by streaming information on the field's scoreboard message line.

Figure 8:
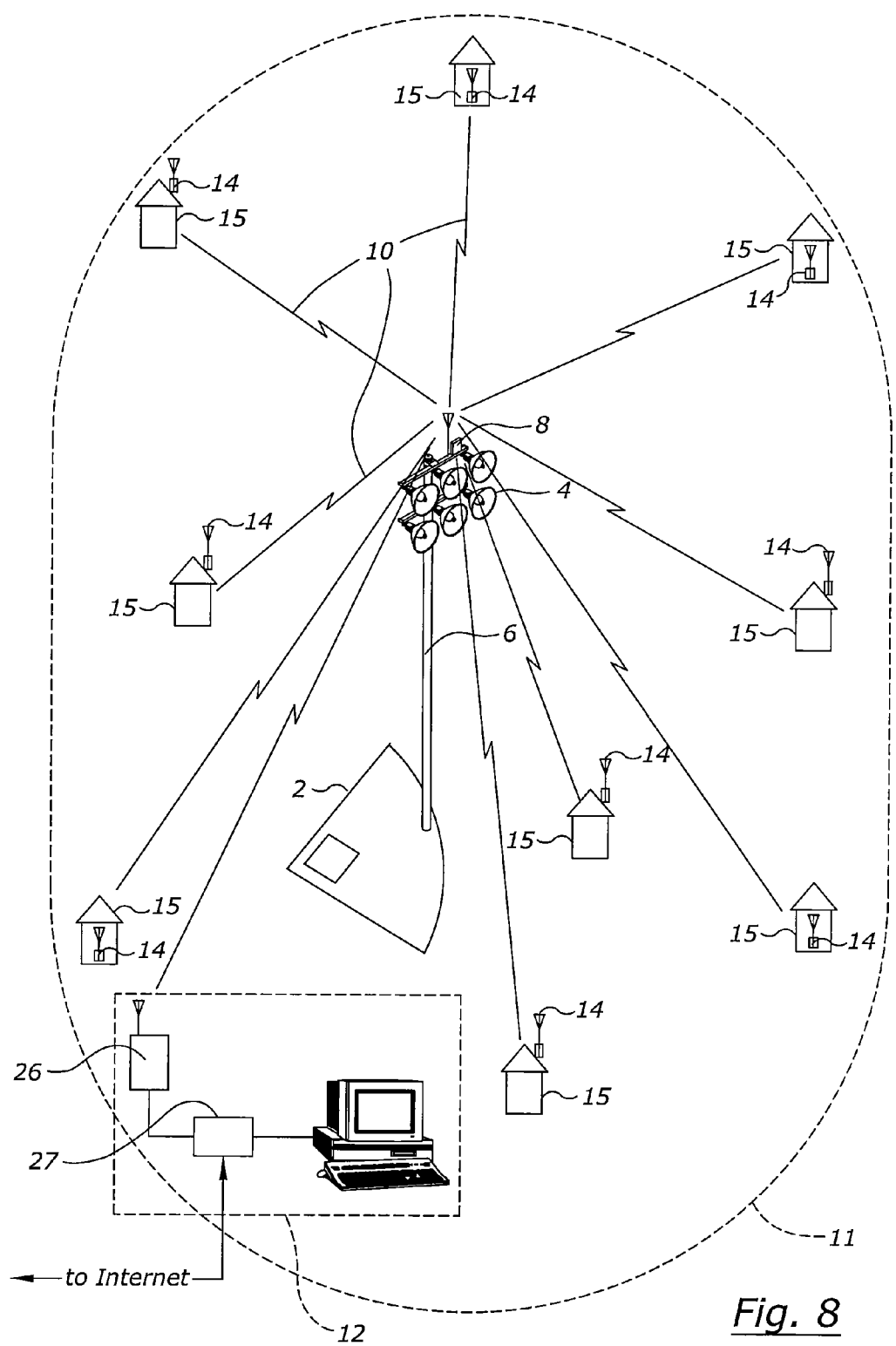
FIG. 8 is a diagrammatic view of one sports lighting installation, wireless communication with a subscriber unit that is in communication with the Internet, and also illustrating the optional feature of using the sports lighting installation as a wireless hub for Internet service to an area around the sports lighting field.

An exemplary embodiment of remote monitoring and control of lighting equipment will now be discussed again in the general environment of sports lighting located at a sports field. As shown in FIG. 1A, and more particularly in FIG. 8, a sports field 2 has sports lighting 4 located on a light pole 6. The sports lighting can be, but is not limited to, any of a number of commercially available systems, including, without limitation, light structure as available from Musco Corporation. FIG. 8 diagrams one light-pole 6 with one array 4 of six lighting fixtures (indicated by circles). However, an array 4 can have any number of lighting fixtures. Normally a sports lighting installation would have several poles 6 each elevating an array 4, spaced apart and aimed to provide coverage of the entire field and the volume of space above the field. Similarly, for security lights, there is especially wide area security, there are normally several elevating structures with one or more lights at the top of each structure. Normally each array of lights would be tied in to a central electrical junction box which would include switches or relays to provide a centralized control for the entire lighting system for that area. For purposes of simplicity, FIG. 8 shows a single pole 6 and array.

The light pole 6 can be any of a number of commercially available light poles, including light structure as available from Musco Corporation. The height of the pole is such that a line of sight communication can be established between a base station 8 located on either the lighting 4 as shown in FIG. 8, but may also be located on the light pole 6. The base station 8 is best shown in FIG. 9.

Returning to FIG. 8, the base station 8 transmits radio waves 10 to a wireless transceiver 26 located on a subscriber unit 12. Subscriber unit 12 is also shown in FIG. 9. The subscriber unit includes wireless transceiver 26 connected to a network interface unit 27 that is connected to an Internet device 18.

Figure 9:
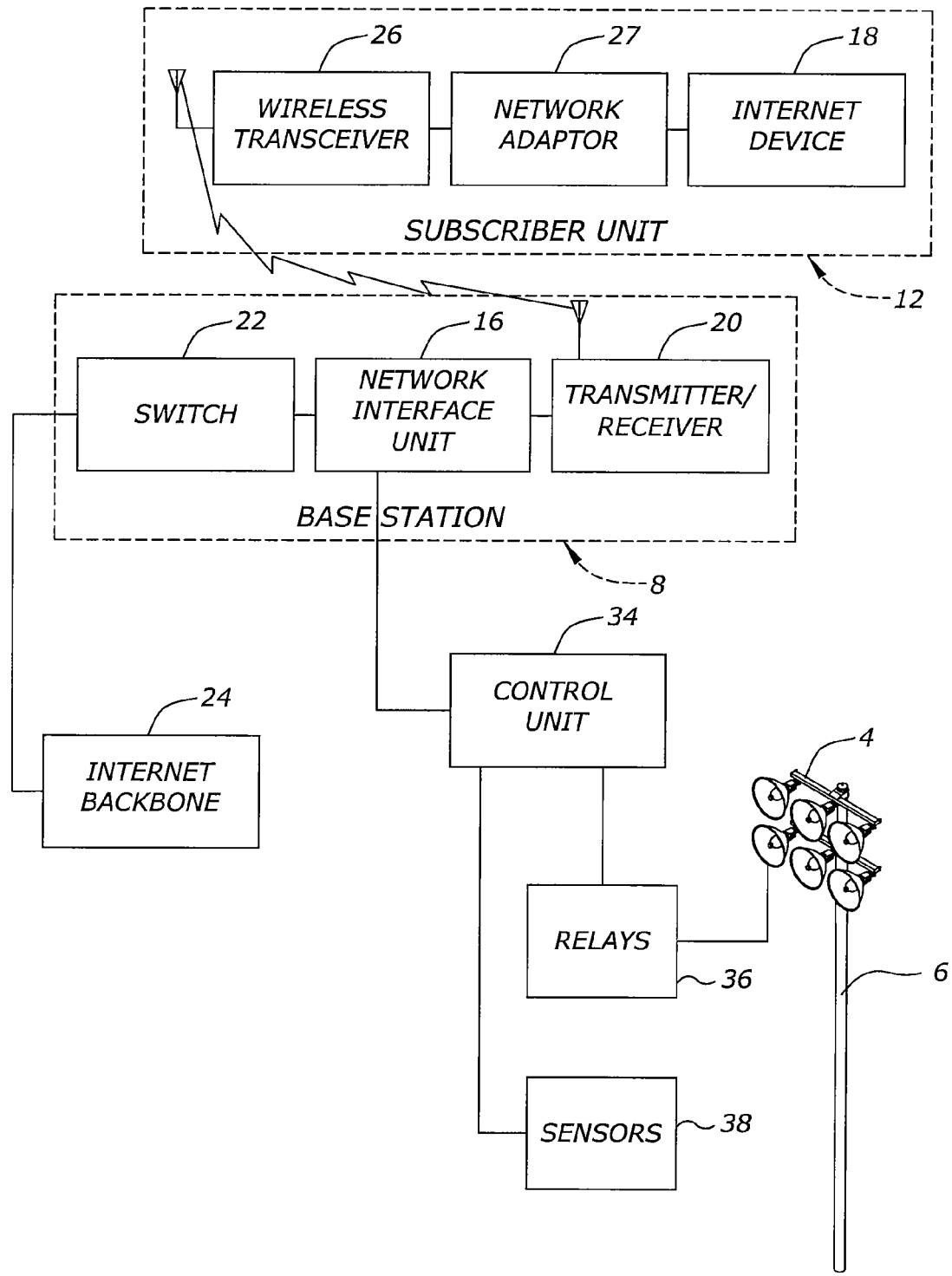
FIG. 9 is a block diagram view of a system according to the present invention.

As shown in FIG. 9, base station 8 transmits and receives radio waves 10 to and from a subscriber unit 12. Internet packets can be sent from the Internet backbone 24 to Internet device 18 in the subscriber unit 12 in the following manner: first, the information is sent on the Internet backbone 24 which is electrically connected to a switch 22 within base unit 8. Switch 22 is electrically connected to network interface unit 16 which is electrically connected to transmitter/receiver 20. The information is sent via radio waves 10 to subscriber unit 12. Within subscriber unit 12, wireless transceiver 26 receives the radio signal 10. This information is then sent through network adapter 27 to the Internet device 18. Information can be sent from subscriber unit 12 to base station 8 and, in turn, to Internet backbone 24 in a similar manner.

Figure 10:
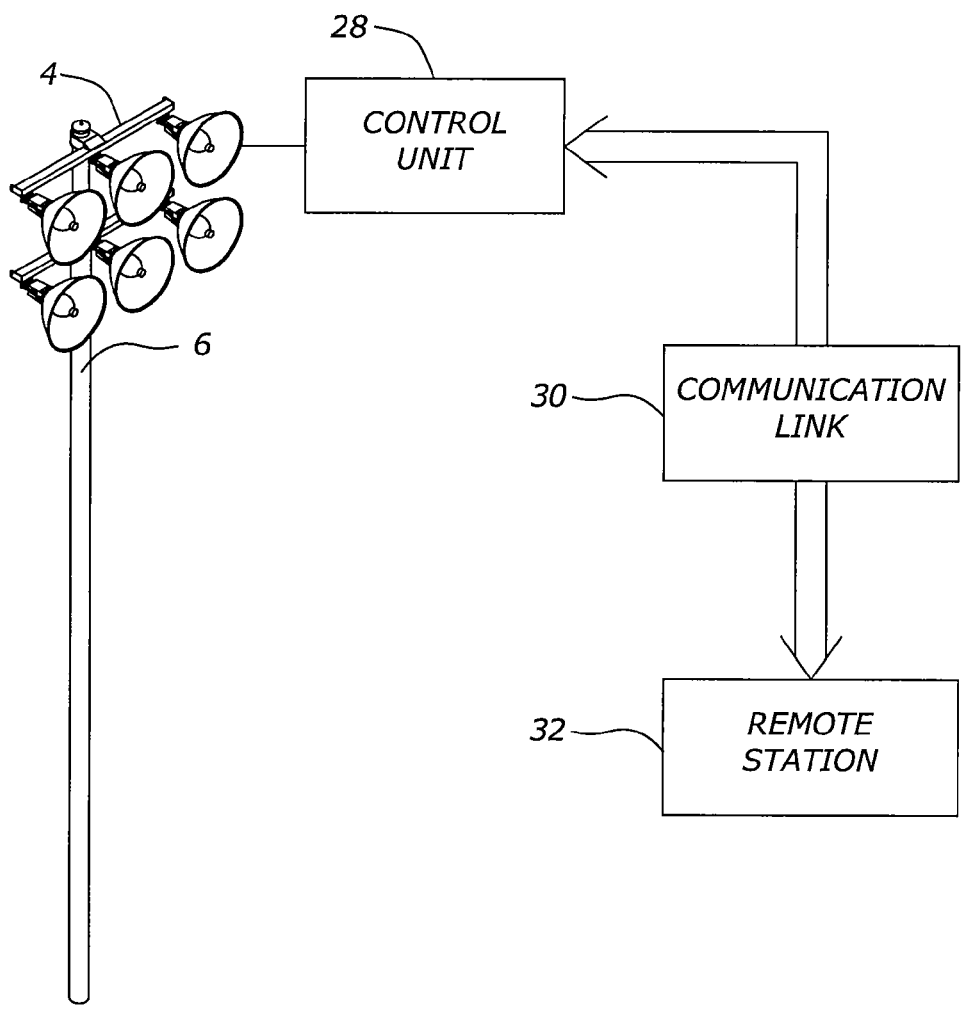
FIG. 10 is a block diagram view of a lighting system and remote control equipment.

FIG. 10 is a block diagram showing a light system 4 controlled remotely. Lights 4 are connected to a control unit 28. Control unit 28 can be housed within the lighting system 4 or may be external as shown best in FIG. 10. Control unit 28 can be, but is not limited to, a computer, microcontroller, or digital controller based system. Control unit 28 interfaces to a communications link 30. Communications link 30 can be, without limitation, a land line system, a telecommunications link, a cellular link, a satellite link, or a radio link. A remote station 32 is also connected to communication link 30 such that remote station 32 can control and monitor light system 4.

Thus, FIG. 8 illustrates how a lighting system 4 can communicate wirelessly to and from a subscriber unit 12. By referring to commonly owned, copending U.S. Ser. Provisional No. 60/142,109, to inventors Crookham et al., a detailed explanation of a number of different control instructions that could be sent from subscriber unit 12 to base station 8 relative to functioning of lighting system 4, are disclosed. Such instruction range from turning lights 4 on and off at scheduled times, to keeping track of the time the lights are on, gathering data about the lights or conditions around the lights, etc. Subscriber unit 12 is linked to the Internet to allow cost effective high speed communications to a central control where a database is maintained relative to lighting system 4 and the events associated therewith. Band width of such communications links allows a significant amount of information to be communicated at the low cost of Internet communications. Because the Internet can utilize existing infrastructure, such as land line telephone, minimal additional components are needed. The wireless link from the subscriber unit 12 to base station 8 eliminates the need for hardware or direct wire connection, thus saving that capital cost.

FIG. 8 also illustrates how base station 8 can function as a wireless hub for a plurality of locations around base station 8. The elevation of base station 8 on pole 6 provides a range of line of sight wireless communication with a plurality of transceivers 14 at location (e.g. residential houses or businesses 15) throughout the line of sight area served by elevated base station 8 (this area is indicated in FIG. 8 by reference number 11). For example, base station 8 elevated 60 to 100 feet would have line of sight wireless communication ability for up to 5 to 10 miles depending on terrain. For an average density of population municipal area, this can translate into approximately 10,000 households. One base station 8 can therefore perform as a wireless Internet hub for a substantial number of Internet end users.

Figure 11:
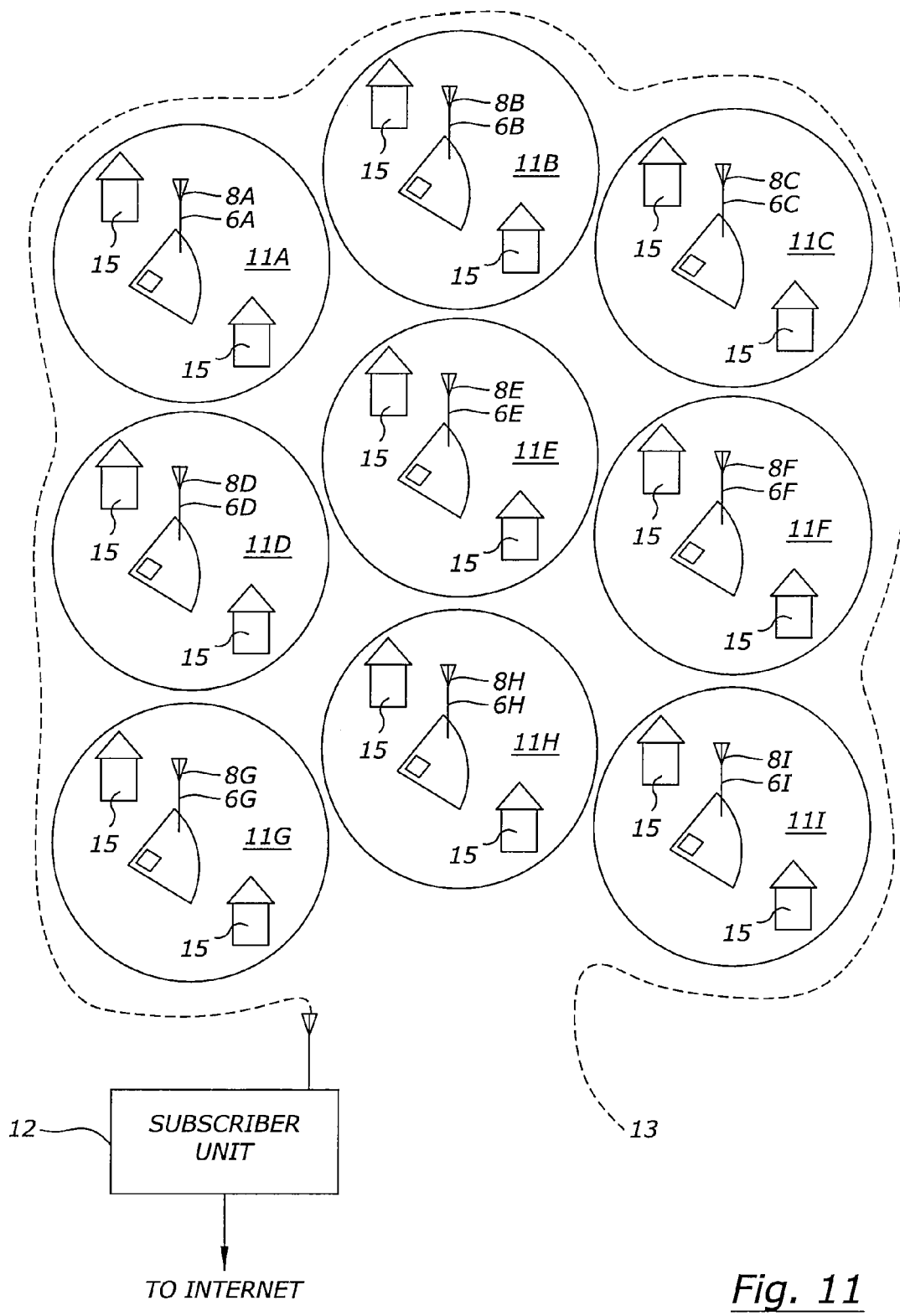
FIG. 11 is a diagrammatic view of a plurality of sports lighting systems and Internet hub coverage for a geographic area.

FIG. 11 illustrates that a plurality of base stations 8A–I could be placed on poles 6A–6I. Each base station 8 could serve as a Internet hub for an area 11. Cumulatively, base stations 8A–8I could cover a significantly large geographic area 13 by each essentially covering a cell 11A–11I within geographic area 13.

The components to operate the system according to the present invention are commercially available as off the shelf components.

The present invention addresses a number of problems in sports lighting as well as wireless communications. Fixed wireless communication provides a viable alternative to local services provided by wireline local exchange carriers, including Internet services. However, due to the high frequencies used in providing typical wireless broadband services, there is a technical problem in that transmitters and receivers must be in line of sight of each other. Local landowners may not always be reasonable and nondiscriminatory in providing access to right of ways, buildings, rooftops, and other facilities that could accommodate fixed wireless transmissions. Furthermore, local laws and policies may work against the construction of poles, towers, or other means of accommodating a transmitter/receiver at a height in which line of sight can be provided to a significant area.

Sports fields that use sports lighting are located around the country and around the world. Sports lighting is also located in rural communities as well as large cities. In addition, municipalities or other sports field owners have a great interest in the community and may recognize a need for community Internet access.

The present invention, by providing Internet connectivity to control sports lighting, in addition provides an effective means of providing Internet communication via fixed wireless technology to a number of sites or subscribers as well. In one embodiment of the present invention, the status of the sports lighting system is controlled through the Internet. This control can include turning lights on or off at a pre-defined time. This control can include increasing or decreasing the intensity of certain lights at a given time. This control could include rotating lights as well.

An additional embodiment of the present invention includes monitoring the status of lights. This may include determining which lights are on or off. Monitoring may include determining the current intensity of a light. Monitoring may include observing the voltage or current levels in the lights to determine if light bulbs are out.

Another embodiment combines the ability to monitor as well as control the sports lights system in order to provide control based upon monitored data.

A further embodiment of the present invention provides this control to be Internet control from a remote site. This permits central control of a multitude of lighting systems. This also provides the potential of having qualified individuals control all lights. This would in addition, provide the maintainer of the lights with instant notice of when an on-site inspection may be needed. For example, monitoring may reveal that certain lights are burnout, thus those bulbs would need replacement. In addition, the time of use for each bulb could be monitored. Thus if certain bulbs had exceeded their average life expectancy, they could be preemptively replaced to ensure continuous lighting. These advantages and others will permit sports lighting systems to be more closely monitored and thus, sports lighting will be less likely to be interrupted in service.

This ability to remotely monitor and control sports lights requires some communications link between the control site and a remote site. This current invention uses an Internet-based method to provide distinct advantages over the prior art. When control can be accomplished over the Internet, sports lights at one or multiple locations can be monitored and controlled from any Internet location.

An Internet communications link at the sports light can be accomplished in a number of different ways. In one embodiment, a land line could be connected to the sports light. For example, a POTS line and a modem could be used to provide a communications channel. In another embodiment, a cellular phone line and a modem could be used to provide a communications channel. Another embodiment would use a wireless link between the light system and a control computer, or another computer and the The system discussed above provides the following possibility. Owners or proprietors of lighting systems such as sports lighting systems or security light systems, could utilize existing or newly built elevated lighting systems to elevate a wireless base station 8. The proprietor could serve as basically a local Internet service provider or could cooperate with a party at a central control to jointly be an Internet service provider. Many time municipalities or governmental entities such as park and rec departments are proprietor of the facilities and lighting systems for the facilities such as sports fields and the like. One possible scenario is that the municipality or government entity could utilize the elevated base stations 8 as Internet hubs and charge a reasonable but economical fee to subscribers in the area of the base station 8. This would provide Internet service at high band width to areas at a cost effective rate for the betterment of communities.

What is claimed is:

1. A system for remote control of one or more sports lights located at a sports field, the system comprising:
    a plurality of high powered, high intensity discharge (HID) sports field light banks having a plurality of HID lights and located proximate the sports field;
    an electronic control unit electrically connected to and adapted to control one or more operational functions of the high powered, HID sports field lights;
    a base station transceiver electrically connected to the electronic control unit for receiving and transmitting wireless wide area network communication signals, the wireless wide area network communication signals having a band with substantially greater than a cellular network control channel;
    a point of presence transceiver communicatively connected to an wide area network for relaying the wide area network communication signals to and from the base station transceiver; and
    a control central remote from the electronic control unit and communicatively connected to the wide area network for originating operational function commands of the high powered, HID sports field lights and communicating the commands to the base station transceiver through the wide area network.

2. The system for remote control of one or more sports lights of claim 1 further comprising a data base communicatively connected to the control central for storing and communicating data to the control central.

3. The system for remote control of one or more sports lights of claim 2 wherein the data is scoring and related sports data.

4. The system for remote control of one or more sports lights of claim 1 further comprising one or more sensors electrically connected to the electronic control unit.

5. The system for remote control of one or more sports lights of claim 4 wherein the control unit and the base station transceiver are used for receiving signals from the sensors, processing the signals into status information, and sending the status information to the control central.

6. The system for remote control of one or more sports lights of claim 1 further comprising one or more subscriber units located remotely from the base station transceiver and the control central, the subscriber units for sending and receiving wide area network communication signals through the base station transceiver to or from the wide area network, allowing subscribers using the subscriber unit to have access to an Internet network.

7. The system for remote control of one or more sports lights of claim 6 wherein the wide area network communication signals between the base station transceiver and the subscriber units are last mile communications.

8. The system for remote control of one or more sports lights of claim 6 wherein the wide area network communication signals between the base station transceiver and the subscriber units are Internet packet communication signals.

9. A method of control of high power, high intensity discharge (HID) sports field lighting comprising the steps of:
    originating an operational function command to control a function of the HID lighting;
    converting the operational function command into an wide area network communication signal;
    sending the wide area network communication signal through a wide area network to a point of presence transceiver;
    transmitting the wide area network communication signal via wireless waves, wherein the communication signal has a band with substantially greater than a cellular network control channel;
    receiving the wireless waves with a base station transceiver that is geographically remote from the point of presence transceiver;
    converting the received wireless waves into the operational function command;
    sending the operational function command to a control unit;
    interpreting the operational function command; and
    performing desired operation of the operational function command to control one or more functions of the HID lighting.

10. The method of control of high power, high intensity discharge (HID) sports field lighting of claim 9 further comprising corresponding with a data base.

11. The method of control of high power, high intensity discharge (HID) sports field lighting of claim 9 further comprising connecting one or more subscriber units to an Internet network through the base station transceiver.

12. The method of control of high power, high intensity discharge (HID) sports field lighting of claim 9 further comprising controlling a scoring unit using the control unit.

13. The method of control of high power, high intensity discharge (HID) sports field lighting of claim 9 further comprising operating a relay device with the control unit to perform a function of the HID lighting.

* * * * *

UNITED STATES PATENT AND TRADEMARK OFFICE
CERTIFICATE OF CORRECTION

PATENT NO.       : 7,209,958 B2                                          Page 1 of 1
APPLICATION NO.  : 09/951988
DATED            : April 24, 2007
INVENTOR(S)      : Crookham et al.

It is certified that error appears in the above-identified patent and that said Letters Patent is hereby corrected as shown below:

Column 15, Claim 1, line 50:
After having a DELETE: "band with"
After having a ADD: --bandwidth--

Column 16, Claim 9, line 36:
After has a DELETE: "band with"
After has a ADD: --bandwidth--

Signed and Sealed this

Nineteenth Day of October, 2010

David J. Kappos
*Director of the United States Patent and Trademark Office*